United States Patent
Isii et al.

(10) Patent No.: US 8,988,858 B2
(45) Date of Patent: Mar. 24, 2015

(54) ELECTRODE FOR ELECTROCHEMICAL CAPACITOR AND ELECTROCHEMICAL CAPACITOR USING SAME

(75) Inventors: Kiyohiro Isii, Osaka (JP); Hideki Shimamoto, Kyoto (JP); Junko Fujisawa, Osaka (JP); Susumu Nomoto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

(21) Appl. No.: 13/821,262

(22) PCT Filed: Oct. 14, 2011

(86) PCT No.: PCT/JP2011/005759
§ 371 (c)(1),
(2), (4) Date: Mar. 7, 2013

(87) PCT Pub. No.: WO2012/049856
PCT Pub. Date: Apr. 19, 2012

(65) Prior Publication Data
US 2013/0163148 A1 Jun. 27, 2013

(30) Foreign Application Priority Data
Oct. 15, 2010 (JP) ................. 2010-232176

(51) Int. Cl.
*H01G 9/00* (2006.01)
*H01G 9/04* (2006.01)
(Continued)

(52) U.S. Cl.
CPC ............... *H01G 11/22* (2013.01); *H01G 11/50* (2013.01); *H01G 11/54* (2013.01); *Y02T 10/7022* (2013.01); *Y02E 60/13* (2013.01)
USPC .......................... 361/502; 361/508

(58) Field of Classification Search
USPC ................................. 361/502, 508
See application file for complete search history.

(56) References Cited

U.S. PATENT DOCUMENTS 6,911,281 B2 * 6/2005 Sonoda et al. ................. 429/199
7,785,495 B2 * 8/2010 Kikuchi et al. ............... 252/500
(Continued)

FOREIGN PATENT DOCUMENTS

JP 58-214281 A 12/1983
JP 05-195221 8/1993
(Continued)

OTHER PUBLICATIONS

International Search Report mailed Jan. 17, 2012 issued in corresponding International Application No. PCT/JP2011/005759.

*Primary Examiner* — Jeremy C Norris
*Assistant Examiner* — Nathan Milakovich
(74) *Attorney, Agent, or Firm* — McDermott Will & Emery LLP (57) ABSTRACT

A negative electrode for an electrochemical capacitor includes a current collector having electric conductivity, and an electrode layer formed on a surface of the current collector and having cations stored therein. In at least a part of the electrode layer, a value of ratio $I_a/I_b$ of peak value $I_a$ indicating a presence of an anion decomposition compound and peak value $I_b$ indicating a presence of an electrolyte in a spectrum of an atom forming the anion is 0.45 or more and less than 2.55 as measured using X-ray photoelectron spectroscopy.

6 Claims, 2 Drawing Sheets

(51) Int. Cl.
  *H01G 9/145* (2006.01)
  *H01G 11/22* (2013.01)
  *H01G 11/50* (2013.01)
  *H01G 11/54* (2013.01)

(56) References Cited

U.S. PATENT DOCUMENTS

| | | | |
|---|---|---|---|
| 2008/0138704 A1 | 6/2008 | Mizuta et al. | |
| 2008/0254363 A1* | 10/2008 | Matsui et al. | 429/207 |
| 2010/0321863 A1* | 12/2010 | Kurakane et al. | 361/502 |
| 2011/0299224 A1* | 12/2011 | Doi et al. | 361/505 |
| 2012/0218683 A1* | 8/2012 | Kondou et al. | 361/527 |
| 2012/0276445 A1* | 11/2012 | Xu | 429/199 |

FOREIGN PATENT DOCUMENTS

| | | |
|---|---|---|
| JP | 09-326262 A | 12/1997 |
| JP | 2007-067105 A | 3/2007 |
| JP | 2010-034071 A | 2/2010 |
| JP | 2010-153560 A | 7/2010 |
| JP | 2010-232574 A | 10/2010 |

* cited by examiner

ELECTRODE FOR ELECTROCHEMICAL CAPACITOR AND ELECTROCHEMICAL CAPACITOR USING SAME

RELATED APPLICATIONS

This application is the U.S. National Phase under 35 U.S.C. §371 of International Application No. PCT/JP2011/005759, filed on Oct. 14, 2011, which in turn claims the benefit of Japanese Application No. 2010-232176, filed on Oct. 15, 2010, the disclosures of which Applications are incorporated by reference herein.

TECHNICAL FIELD

The present invention relates to an electrochemical capacitor used for power supplies for backup and power regeneration, or an electric power storage in various electronic apparatuses, hybrid vehicles and fuel-cell electric vehicles, and to an electrode used for the electrochemical capacitor.

BACKGROUND ART

When an electronic apparatus is operated, energy required therefor is taken into the electronic apparatus. However, it is difficult to allow all of the taken energy to be consumed for operating the electronic apparatus. A part of the energy is consumed as thermal energy or the like without achieving the original object. It is expected that the energy consumed in this way is once stored as electrical energy in a storage element, and the stored energy is reused if necessary, thereby reducing consumed energy and increasing efficiency.

In order to do so, a storage element from which energy necessary for an operation of an electronic apparatus can be taken out at an appropriate output is needed. Examples of the storage element include a capacitor and a secondary battery. Among them, in particular, much attention has been paid to electric double layer capacitors that have large capacitance, are capable of rapid charge and discharge, and have high long-term reliability. Such capacitors are used in many fields.

The electric double layer capacitor includes polarizable electrodes, as a positive electrode and a negative electrode, mainly including activated carbon. A withstand voltage of the electric double layer capacitor is 1.2 V when an aqueous electrolytic solution is used, and 2.5 to 3.3 V when an organic electrolytic solution is used.

However, the electric double layer capacitor has a smaller energy density than a secondary battery. Since the energy density is in proportion to capacitance and squared voltage, it is necessary to improve at least one of these elements in order to increase the energy density of the electric double layer capacitor.

In order to increase a voltage of a capacitor, it has been proposed that electric potential of a negative electrode is lowered by allowing lithium ions to be previously stored (pre-doped) into carbon material of the negative electrode. Such a capacitor includes a negative electrode in which lithium ions are stored, a positive electrode as a polarizable electrode, and an electrolytic solution with which the positive electrode and the negative electrode are impregnated and which contains lithium salt. This capacitor is charged and discharged in a range in which lithium ions pre-doped into the negative electrode are not released.

Figure 2A:
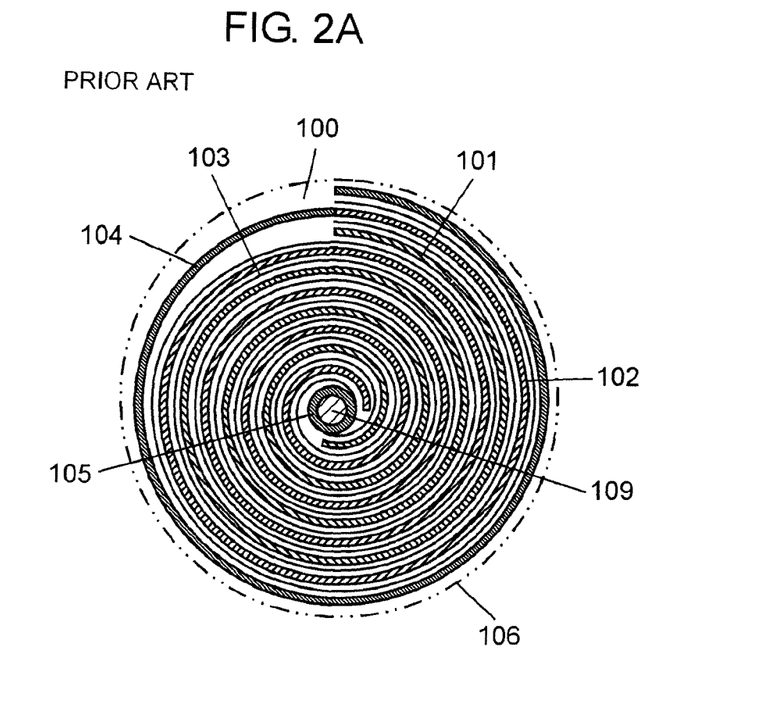
FIG. 2A is a horizontal sectional view of a conventional capacitor.
Figure 2B:
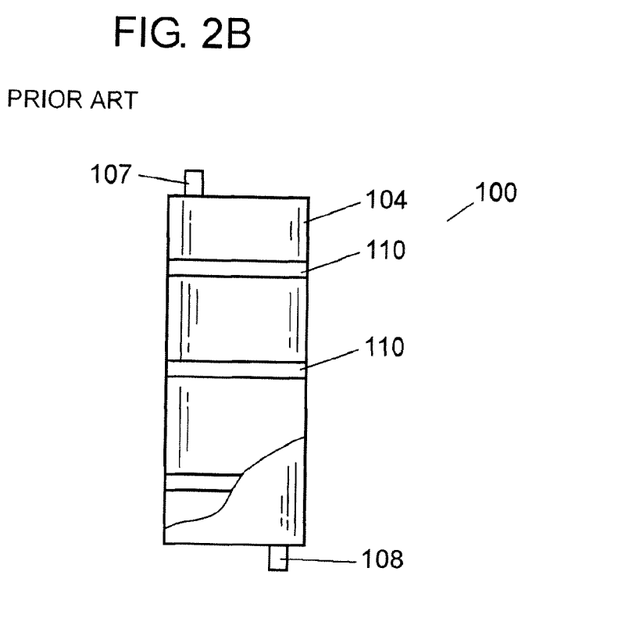
FIG. 2B is a partially cut-away front view of an element used for the capacitor shown in FIG. 2A.

FIG. 2A is a top sectional view of a capacitor in which a lithium ion is used as a cation, which is shown as an example of a conventional capacitor. FIG. 2B is a partially cut-away front view of electrode-wound unit 100 of the capacitor.

As shown in FIG. 2A, the capacitor includes electrode-wound unit 100. Electrode-wound unit 100 is formed such that positive electrode 101 and negative electrode 102 are laminated alternately with separator 103 interposed therebetween to form a laminated body, and the laminated body is wound concentrically. Lithium metals (lithium electrodes) 104 and 105 are disposed, as lithium ion supply sources, at an outer peripheral portion and a central portion of electrode-wound unit 100, respectively. Lithium metal 105 formed at the central portion is supported by tube pole 109. Tube pole 109 simultaneously functions as a shaft pole for supporting electrode-wound unit 100. These are housed in exterior container 106 made of aluminum or iron, the inside of exterior container 106 is filled with an electrolytic solution, and thus the capacitor is configured.

Positive electrode 101 and negative electrode 102 each includes a current collector (not shown) made of porous material provided with through-holes penetrating from a front surface to a back surface thereof. Since the current collector is made of porous material, even if lithium metals 104 and 105 are disposed at the outer peripheral portion and the central portion of electrode-wound unit 100, lithium ions can freely move between the electrodes from lithium metals 104 and 105 through the through-holes of the current collector of electrode-wound unit 100. As a result, lithium ions are previously doped (pre-doped) over entire negative electrode 102.

As shown in FIG. 2B, electrode terminals 107 and 108 are coupled to the current collector of positive electrode 101 and the current collector of negative electrode 102, respectively. Electrode terminals 107 and 108 are led out in the opposite directions along the winding axis direction of cylindrical electrode-wound unit 100. The outermost periphery of electrode-wound unit 100 is fixed by tape 110 so that a wound-shape is held.

In this way, in a conventional capacitor, lithium-ion supply sources are disposed at two portions, that is, at the outer peripheral portion and the central portion of electrode-wound unit 100. This arrangement permits more rapid doping of lithium ions into negative electrode 102 than a method of doping by supplying lithium ions from one lithium-ion supply source. Such a capacitor is disclosed in, for example, Patent Literature 1.

However, in a capacitor having a negative electrode that repeats storing and releasing cations such as lithium ions during charge and discharge, when charge and discharge are repeated after a cell is produced, various properties are deteriorated. As one of the deteriorations of the properties, the electrical potential of the negative electrode, which has been lowered by pre-doping, is raised. When the electric potential of the negative electrode is raised, a potential difference between the positive and negative electrodes is reduced, and the energy density of a storage device is reduced.

CITATION LIST

[Patent Literature 1] Japanese Patent Unexamined Publication No. 2007-067105

SUMMARY OF THE INVENTION

The present invention provides an electrochemical capacitor that improves and maintains an energy density by suppressing a raise of electric potential of a negative electrode during charge and discharge, and an electrode used for the electrochemical capacitor.

An electrode for a capacitor according to the present invention includes a current collector, and an electrode layer formed on the current collector. In at least a part of the electrode layer, a ratio $I_a/I_b$ is 0.5 or more and less than 2.55. $I_a$ is a peak value indicating a presence of an anion decomposition compound and $I_b$ is a peak value indicating a presence of an electrolyte both in a spectrum of an atom forming the anion as measured by X-ray photoelectron spectroscopy method. Furthermore, the capacitor of the present invention includes the above-mentioned electrode as a negative electrode.

By configuring an electrode for an electrochemical capacitor or an electrochemical capacitor with the above-mentioned configuration, the increase of electric potential of the negative electrode is suppressed and the energy density of the capacitor can be improved.

DETAILED DESCRIPTION OF THE PREFERRED EMBODIMENTS

Figure 1:
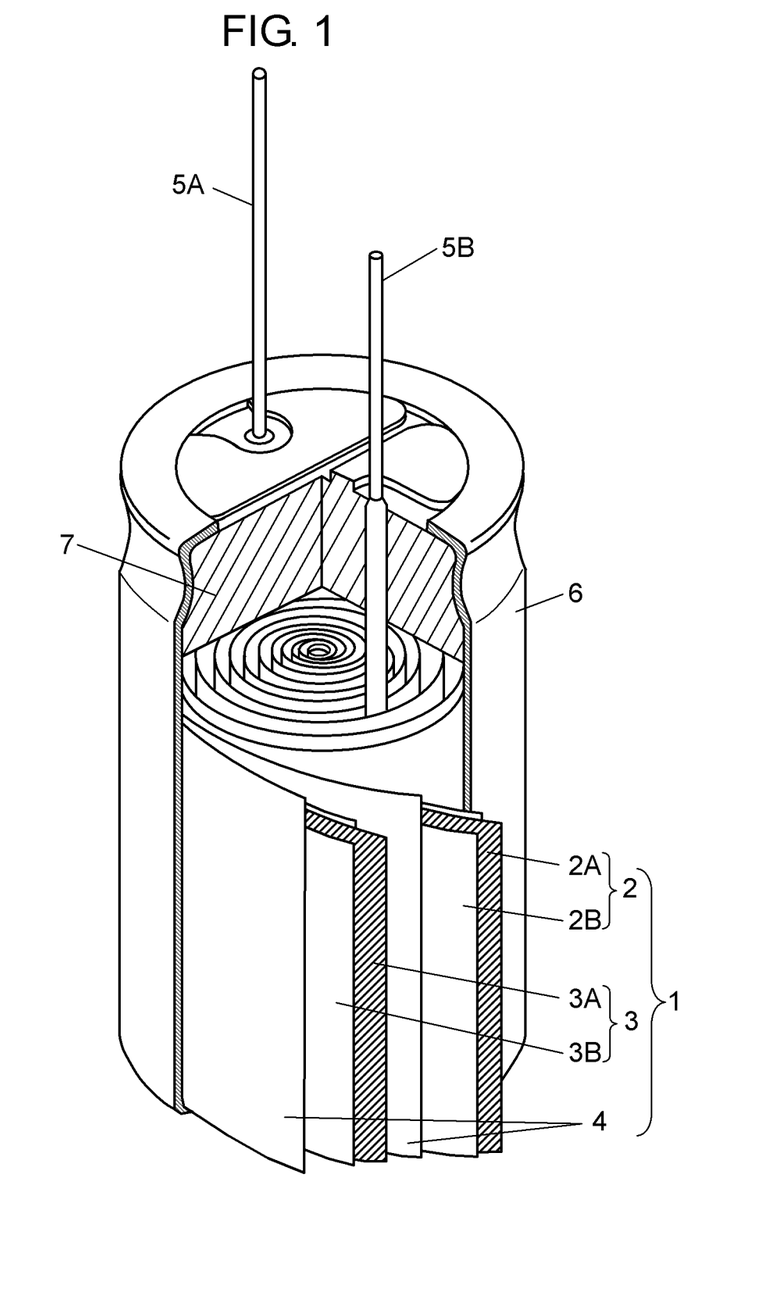
FIG. 1 is a partially cut-away perspective view of a capacitor in accordance with an exemplary embodiment of the present invention.

FIG. 1 is a partially cut-away perspective view of a capacitor in accordance with an exemplary embodiment of the present invention. The capacitor includes capacitor element (hereinafter, referred to as "element") 1, an electrolytic solution (not shown) with which element 1 is impregnated and which includes an electrolyte containing cations and anions, and bottomed cylindrical exterior member 6 housing element 1 and the electrolytic solution.

Element 1 includes positive electrode 2, negative electrode 3, and separator 4. Separator 4 is interposed between positive electrode 2 and negative electrode 3. Positive electrode 2 includes current collector 2A as a first current collector having electric conductivity, and electrode layer 2B as a first electrode layer formed on a surface of current collector 2A. Negative electrode 3 includes current collector 3A as a second current collector having electric conductivity, and electrode layer 3B as a second electrode layer formed on a surface of current collector 3A. Electrode layer 2B is capable of adsorbing and desorbing anions constituting the electrolyte, and electrode layer 3B has cations constituting the electrolyte stored.

Current collector 2A is formed of, for example, aluminum, and current collector 3A is formed of, for example, copper. Electrode layer 2B is a polarizable electrode layer including activated carbon that adsorbs and desorbs anions. Electrode layer 3B mainly includes carbon material, and has lithium ions as cations stored therein. In FIG. 1, element 1 is formed by winding positive electrode 2 and negative electrode 3 with separator 4 interposed therebetween. However, element 1 is not limited to this structure, and for example, it may have a structure in which a flat-shaped positive electrode 2 and negative electrode 3 are laminated via separator 4.

Lead wires 5A and 5B as electrode lead-out terminals are coupled to surfaces of positive electrode 2 and negative electrode 3, respectively. Sealing member 7 seals an opening end of exterior member 6 in such a manner that lead wires 5A and 5B are expressed.

Next, a manufacturing method of the capacitor is described. Note here that the below-mentioned manufacturing method is one example for achieving a configuration of the present invention, and present invention is not limited to the below-mentioned manufacturing method.

Firstly, a procedure for producing positive electrode 2 is described. As current collector 2A, for example, high-purity aluminum foil (purity: 99.30% or higher) having a thickness of about 15 µm is used. The aluminum foil is subjected to electrolytic etching in a chlorine-based etchant so as to roughen the surface. Electrode layers 2B are formed on the front and back surfaces of current collector 2A whose surface is thus roughened. Material constituting electrode layer 2B includes activated carbon, a binding agent, an electroconductive auxiliary agent, and the like.

As the activated carbon, for example, coke activated carbon is used. As the binder, for example, an aqueous solution of polytetrafluoroethylene (PTFE) is used. As the electroconductive auxiliary agent, for example, acetylene black is used. A mixing weight ratio of activated carbon:binding agent:electroconductive auxiliary agent is, for example, 10:2:1. The resultant mixture is kneaded and mixed by using a kneading machine, and adjusted to have predetermined viscosity. When kneading is carried out, carboxymethyl cellulose (CMC) as a dispersing agent is added, for example.

The thus prepared paste is coated on the front and back surfaces of current collector 2A, and dried in an air atmosphere at 100° C. so as to form polarizable electrode layer 2B. The thickness of electrode layer 2B is, for example, 40 µm. Thereafter, current collector 2A provided with electrode layers 2B is subjected to slit processing so as to have a predetermined width.

Furthermore, a part of electrode layers 2B formed on the front and back surfaces of current collector 2A is removed, and lead wire 5A formed of, for example, aluminum is coupled to a portion in which current collector 2A is exposed by, for example, needle caulking. As mentioned above, positive electrode 2 is completed.

Next, a procedure for producing negative electrode 3 is described. As current collector 3A, for example, copper foil having a thickness of about 15 µm is used, and electrode layers 3B are formed on the front and back surfaces of the copper foil. For material that constitutes electrode layer 3B, as the carbon material capable of reversibly storing and releasing lithium ions, for example, soft carbon is used. For the electroconductive auxiliary agent, similar to positive electrode 2, for example, acetylene black is used. As the binding agent, for example, styrene butadiene rubber (SBR) is used. When these materials are mixed, the soft carbon, the electroconductive auxiliary agent, and the binding agent are mixed at a weight ratio of 8:1:1.

When the paste is prepared, CMC, acetylene black, soft carbon, and SBR are placed into water sequentially in this order, followed by stirring and kneading thereof so as to produce the paste.

The paste is coated on the front and back surfaces of current collector 3A by using a comma coater, a die coater, or the like, and dried in an atmosphere at 80° C. A thickness of one surface of the coated product after it is dried is, for example, about 50 µm. Current collector 3A in which the coated product is formed on the front and back surfaces in this way is subjected to press processing with a linear pressure of 75 to 100 kgf/cm to form electrode layer 3B whose thickness of one side is adjusted to 40 µm and the density is adjusted to 0.4 to 1.0 g/cm³. Then, current collector 3A provided with electrode layers 3B on the front and back surfaces thereof is subjected to slit processing so as to have a predetermined width.

Furthermore, similar to positive electrode 2, a part of electrode layers 3B formed on the surfaces of current collector 3A is removed, lead wire 5B formed of, for example, copper is coupled to a portion in which current collector 3A is exposed by, for example, resistance welding. As mentioned above, negative electrode 3 is completed.

Note here that soft carbon is used as the carbon material because it is excellent in terms of low resistance or charge-discharge cycle lifetime, but other candidates for the carbon material include graphite carbon, low-temperature baked carbon, hardly-graphitizable carbon, or the like. Since specialized performances are different in comparison of physical properties of respective material, the material may be appropriately selected according to the purposes of use. For example, graphite carbon has high voltage resistance and a low energy loss in the charge-discharge cycle. The low-temperature baked carbon is excellent in large capacity and low resistance. The hardly-graphitizable carbon is excellent in large capacity and a small cycle loss.

Next, a lithium layer (not shown) including a cation atom as a dope source is provided on exterior member 6. Unlike positive electrode 2, negative electrode 3 is required to allow lithium ions to be stored in the carbon material by pre-doping. The lithium layer is formed on the surface of a base material having electric conductivity. The base material and negative electrode 3 are soaked in the electrolytic solution in a state in which they are electrically connected to each other. Thereby, metallic lithium is ionized, and the base material and negative electrode 3 are short-circuited due to potential difference between the lithium ion and the carbon material in negative electrode 3. Then, lithium ions are stored in the carbon material.

Examples of a method for providing the lithium layer include use of commercially available foil-shaped metallic lithium. A method for forming a lithium ion supply source is not limited to this method, and the lithium ion supply source may be formed by a gas phase method, a liquid phase method, or the like. Pre-doping is described in detail later.

Next, a procedure for producing element 1 is described. Positive electrode 2 and negative electrode 3 are allowed to face each other and laminated with separator 4 sandwiched therebetween so as to form a laminated body. Separator 4 is made of, for example, cellulose paper having a thickness of about 35 μm and a density of 0.45 g/cm³ as material. The laminated body is wound such that separator 4 is interposed between facing positive electrode 2 and negative electrode 3 so as to complete winding element 1.

Next, a procedure for housing element 1 and an electrolytic solution in exterior member 6 is described. As the electrolytic solution, for example, a solution obtained by dissolving an electrolyte containing lithium ions as cations, and anions containing a fluorine atom in view of a withstand voltage property into a solvent is used. As the above-mentioned anion, $BF_4^-$ or $PF_6^-$ is preferable. As the solvent, for example, a mixed solvent is used, in which ethylene carbonate (EC) having high dielectric constant and dimethyl carbonate (DMC) having low viscosity are mixed with each other at a weight ratio of 1:1. Note here that the electrolytic solution is not limited to the above-mentioned configuration, and the same effect can be exhibited as long as the solution contains lithium ions. In addition to lithium ions, cations whose oxidation-reduction potential is lower than that of the carbon material can be used.

Exterior member 6 is formed of, for example, metals such as iron, aluminum, copper, and nickel, from the viewpoint of heat dissipation, but the material is not particularly limited as long as it has low possibility that it reacts with the electrolytic solution. Furthermore, exterior member 6 may be a prism case or a laminate type.

Herein, pre-doping given to negative electrode 3 constituting element 1 is described. The pre-doping is storage treatment for allowing lithium ions to be stored in negative electrode 3 previously. Note here that the storage denotes a phenomenon that lithium ions in the vicinity of negative electrode 3 enter an interlayer portion of a multi-layer crystal structure having the interlayer portion of the carbon material, thus producing an interlayer compound of carbon atoms and lithium atoms.

Thus, when lithium ions are stored in negative electrode 3, electrode potential of negative electrode 3 is lowered by the electrochemical reaction of lithium ions. As a result, the potential difference between positive electrode 2 and negative electrode 3 used for the capacitor is increased, and thereby the energy density of the capacitor is improved.

In this exemplary embodiment, negative electrode 3 having the lithium layer on the surface thereof is impregnated with an electrolytic solution including at least an electrolyte containing lithium ions as cations and anions as well as an additive including a benzene compound having a nitro group. Thus, metallic lithium constituting the lithium layer is brought into contact with an electrolytic solution, and thereby the metallic lithium is ionized. Then, lithium ions are inserted between the layers of the multi-layer crystal structure possessed by the carbon material and stored into the carbon material of negative electrode 3. In more detail, lithium ions form $LiC_6$ together with electrons supplied from the lithium layer to negative electrode 3 and carbon material. As a result, the electric potential of negative electrode 3 is lowered.

Along with the lowering of the electric potential of negative electrode 3 in pre-doping, the above-mentioned additives and the solvent and the anions constituting the electrolytic solution are decomposed. Thus, a decomposition product forms a coating film on the surface of the carbon material of negative electrode 3. The decomposition is described later.

In this way, by impregnating negative electrode 3 with an electrolytic solution for a predetermined time, a predetermined amount of metallic lithium of the lithium layer formed on negative electrode 3 is stored in the carbon material, and thus pre-doping is completed.

Note here that in the field of a lithium ion secondary battery, lithium ions are pre-doped into negative electrode 3. However, pre-doping in the lithium ion secondary battery has an object to reduce irreversible capacity of the negative electrode during a charge-discharge cycle, and to improve charge-discharge capacity. Thus, an object and effect are different from those in the pre-doping in the capacitor. An object of pre-doping of the capacitor is to increase a voltage of the capacitor by lowering electric potential of negative electrode 3. Due to the difference in the objects, storage amounts of lithium ions in respective pre-doping are different from each other. Therefore, since the storage amount of lithium ions in the lithium ion secondary battery is an amount of only irreversible capacity of negative electrode 3, the storage amount is obviously smaller than that of lithium ions of the capacitor.

Next, a procedure of sealing is described. Firstly, lead wires 5A and 5B protruding from element 1 are allowed to pass through through-holes provided in sealing member 7. In this state, element 1 is inserted into exterior member 6, and sealing member 7 is disposed at an opening part of exterior member 6. Then, drawing processing is given from the outer peripheral surface in the vicinity of the opening part of exterior member 6 at which sealing member 7 is located to the inside of exterior member 6. By giving curling processing to an opening end of exterior member 6 in this way, sealing member 7 is crimped and pressed with gripping so as to be fixed. According to the above-mentioned procedure, the procedure of sealing the opening part of exterior member 6 is completed.

Finally, in order to maintain the quality, an assembled capacitor is subjected to aging, and then electrical initial operation is confirmed. As mentioned above, a capacitor according to this exemplary embodiment is completed.

Next, a surface reaction of negative electrode 3 in pre-doping is described. When the electric potential of negative electrode 3 is lowered by pre-doping, the solvent, the anions and the additive in the electrolytic solution are reduced and decomposed at this electric potential. Decomposition products thereof are produced competitively so as to form a surface coating film on negative electrode 3.

It is thought that an anion decomposition compound forms a rough film. It is thought that since the electrolytic solution penetrates to the surface of negative electrode 3 via such a rough film, lithium ions that have already been stored in electrode layer 3B is further consumed.

However, it is thought that in formation of the surface coating film of negative electrode 3, when some additives are present, production of the anion decomposition compound is suppressed. In this way, by suppressing the formation of the rough film of the anion decomposition compound, it is possible to suppress raise in the electric potential of negative electrode 3.

As a phenomenon, in at least a part of electrode layer 3B of negative electrode 3, a value of $I_a/I_b$ that is a ratio of peak value $I_a$ indicating the presence of the anion decomposition compound and peak value $I_b$ indicating the presence of the electrolyte in the spectrum of an atom forming an anion is only required to be 0.45 or more and less than 2.55 as measured using X-ray photoelectron spectroscopy method (XPS). By controlling the surface of negative electrode 3 in this way, even after charge and discharge are repeated, it is possible to suppress increase in the electric potential of negative electrode 3.

That is to say, it is thought that when the additives reach its reduction potential and are decomposed, and, according to the decomposition, a compound obtained by decomposition is formed as a part of a coating film of solid electrolyte interphase (hereinafter, referred to as "SEI") on the surface of the carbon material included in electrode layer 3B. Thus, it is thought that decomposition of the solvent in the electrolytic solution at the reduction potential of the solvent, and formation of a compound derived from the solvent obtained by the decomposition as a part of the SEI coating film are suppressed.

When the additives are decomposed in the electrolytic solution in pre-doping, it is preferable that the reduction potential of the additives is higher than that of the solvent. When such additives and solvent are combined with each other and when the electric potential of negative electrode 3 in pre-doping in the electrolytic solution drops, the additives are decomposed before the electric potential reaches the reduction potential of the solvent. Therefore, when negative electrode 3 reaches the reduction potential of the solvent, a predetermined amount of insulating material and lithium conductive material (a compound that insulates electricity but allows lithium ions to permeate) are formed on the surface of negative electrode 3. Consequently, the decomposition of the solvent is suppressed even at the reduction potential of the solvent, and the coating films by the decomposition of the additives can be increased in the SEI coating film covering the carbon material. Therefore, it is possible to enhance the effect of suppressing increase in the electric potential of negative electrode 3.

Furthermore, it is preferable that a decomposition reaction of additives generated when the electric potential reaches the reduction potential is an irreversible reaction. This is because when a reversible reaction occurs after the capacitor is produced, additives that should have been decomposed are generated, thus the reproduced additives may provide any bad effect to the charge and discharge after the capacitor is produced.

In the above-mentioned electrolytic solution using $LiPF_6$ as an electrolyte and a mixture solution including EC and DMC at the weight ratio of 1:1 as a solvent, a peak that has peak value $I_a$ indicating the presence of an anion decomposition compound ($POF_X$ or the like) is in the range of 130 eV or more and less than 135 eV in the spectrum of P2p. A peak that has peak value $I_b$ indicating the presence of electrolyte $LiPF_6$ is a peak in the range from 135 eV to 140 eV, inclusive, in the spectrum of P2p.

Specific examples of material to be used in this exemplary embodiment include nitrobenzoic acid, nitrophthalic acid, and the like. The decomposition potential of nitrobenzoic acid is 2.272 to 2.306 V (vs Li/Li$^+$), and the decomposition potential of nitrophthalic acid is 2.22 to 2.64 V (vs Li/Li$^+$). However, the additives are not limited thereto. Furthermore, a preferable amount of such additives when they are contained in the electrolytic solution is described later.

The decomposition potentials (the reduction potentials) of these compounds can be calculated from a peak of a curve of cyclic voltammetry detected when a cell for obtaining basic properties described below is used. The cell for obtaining basic properties is a cell with three electrodes including a counter electrode, a reference electrode and a working electrode. Each of the counter electrode and the reference electrode has a lead wire made of nickel and a nickel mesh welded to the lead wire. Foil-shaped metallic lithium is attached on the surface of the nickel mesh. Negative electrode 3 is used as the working electrode.

Since these additives have decomposition potentials higher than that of the solvent, they are decomposed more preferentially than the solvent. Then, an additive-derived compound is formed as a SEI coating film. In general, the reduction potential of propylene carbonate to be used as a solvent is about 0.8 V (vs Li/Li$^+$). The reduction potential of EC is about 0.6 to 0.7 V (vs Li/Li$^+$). Since the reduction potential of DMC is higher than the reduction potential of EC, when a mixture solvent of EC and DMC is used, EC is reduced preferentially.

As mentioned above, in the capacitor of this exemplary embodiment, even if the electric potential of negative electrode 3 is made to be lower than the reduction potential of the solvent by pre-doping, release of lithium ions stored in negative electrode 3 in pre-doping from negative electrode 3 is suppressed. Therefore, a large energy density is maintained for a long time and the initial capacity can be improved. This effect is described with reference to specific examples hereinafter.

(Performance Evaluation Test)

Firstly, parameters and production procedures of samples A and B in accordance with the exemplary embodiment of the present invention and comparative example of a capacitor are described. In sample A, in the capacitor configured as mentioned above, as the additives, nitrobenzoic acid (p-nitrobenzoic acid) is added at 0.06 wt % with respect to carbon material of electrode layer 3B. In sample B, instead of nitrobenzoic acid in sample A, nitrophthalic acid (4-nitrophthalic acid) is added at 0.06 wt % with respect to the carbon material. The comparative example shows a capacitor from which no additive is used in the capacitor configured as mentioned above. Note here that as a solute of an electrolytic solution of each capacitor, 1 mol/l of $LiPF_6$ is used.

Results of the performance evaluation test in which peak ratios $I_a/I_b$ and the performances are measured in the capacitors are shown in

TABLE 1

| | peak ratio $I_a/I_b$ | initial capacity $C_f$ (F.) | Capacity retention rate $C_l$ (%) | Raise rate of electric potential of negative electrode (%) |
|---|---|---|---|---|
| sample A | 2.497 | 0.8 | 94.0 | 251 |
| sample B | 2.385 | 0.8 | 98.3 | 266 |
| Comparative example | 2.554 | 0.8 | 89.6 | 327 |

Firstly, the initial capacity when each capacitor is subjected to 100 C discharge, a capacity retention rate after 4500 cycles of charge and discharge is carried out in the atmosphere of 60° C., and the increase rate of electric potential of the negative electrode are measured. Note here that the initial electric potential of each sample is made to be substantially the same. Peak ratio $I_a/I_b$ can be measured by, for example, the following method. The electrolytic solution is exhausted from the capacitor including negative electrode 3 immediately after pre-doping is carried out, in the dry room at a dew point of −40° C. or lower. DMC is added to the capacitor, and vacuum drawing is carried out at $-8 \times 10^{-2}$ MPa for three minutes, and thus DMC is exhausted. The addition, vacuum drawing and exhaustion of DMC are repeated three times. Next, the capacitor is disassembled and negative electrode 3 is taken out, and 5 mm square of the central portion of negative electrode 3 is cut out, mounted on a measurement holder and stored at $2 \times 10^{-3}$ Pa or less for 17 hours. The holder is packed in a laminate bag, and moved to a measurement room (air atmosphere). The laminate bag is opened in a booth directly linked to XPS equipment in a nitrogen atmosphere, and the holder taken out from the laminate bag is introduced into the XPS equipment. Then, measurement is carried out by using XPS. At this time, measurement is carried out with respect to a position at a depth from the outermost layer of negative electrode 3 to 3.15 nm, which is calculated on the $SiO_2$ basis when a surface of negative electrode 3 is sputtered by argon sputtering. Note here that the irradiation conditions of X ray in the XPS are not particularly limited.

As is apparent form Table 1, in samples A and B into which additives having a nitro group are added, the increase in the electric potential of the negative electrode after charge and discharge are repeated is suppressed as compared with the comparative example.

Next, when an electrolytic solution into which nitrobenzoic acid has been added is used as in sample A, by changing peak ratio $I_a/I_b$ by changing the addition amount of nitrobenzoic acid, the change rate (raise rate) of the electric potential of the negative electrode is measured. The results are shown in Table 2. In Table 2, the added amounts of nitrobenzoic acid in the cases of peak ratio $I_a/I_b$ is 2.554, 2.538, 2.497, 2.087, 0.452, 0.438 and 0.351 are no addition, and addition of 0.01 wt %, 0.06 wt %, 0.1 wt %, 1.0 wt %, 2.0 wt %, and 2.5 wt %, respectively.

TABLE 2

| peak ratio $I_a/I_b$ | 2.554 | 2.538 | 2.497 | 2.087 | 0.452 | 0.438 | 0.351 |
|---|---|---|---|---|---|---|---|
| Raise rate of electric potential of negative electrode (%) | 327 | 283 | 251 | 280 | 272 | 321 | 346 |

From Table 2, it is shown that when peak ratio $I_a/I_b$ is 0.45 or more and less than 2.55, the raise rate of the electric potential of the negative electrode is suppressed to less than 300. When the content of additives is low, the amount of the additive-derived SEI coating film formed on the surface of negative electrode 3 becomes insufficient. As a result, decomposition of anions easily proceeds, and $I_a/I_b$ is raised. The threshold of $I_a/I_b$ is 2.55. That is to say, when $I_a/I_b$ becomes this value or more, the effect of suppressing the increase in the electric potential of negative electrode 3 cannot be sufficiently obtained.

On the other hand, when the content of additives is high, decomposition of anions is extremely regulated. In this case, a large number of anions remain in the electrolytic solution, and the ionization degree of $LiPF_6$ is lowered. Since not-ionized $LiPF_6$ is easily hydrolyzed, hydrogen fluoride (HF) is easily generated by the hydrolysis. The generated HF destroys a SEI coating film of negative electrode 3, and lithium ions stored in electrode layer 3B are consumed so as to repair the destroyed SEI coating film. It is thought that the electric potential of negative electrode 3 is raised in this way. Therefore, it is necessary to provide an upper limit of the added amount of additives and to decompose anions to some extent. The threshold of $I_a/I_b$ at this time is 0.45. That is to say, when $I_a/I_b$ is less than this value, an effect of suppressing the increase in the electric potential of negative electrode 3 cannot be obtained sufficiently.

Furthermore, when the content of additives is high so that peak ratio $I_a/I_b$ is less than 0.45, not-decomposed additives remain in the electrolytic solution after pre-doping. When charge and discharge are carried out in this state, remaining portion of additive 2 is decomposed in positive electrode. The decomposition product remains in the electrolytic solution, or is attached to electrode layer 2B of positive electrode 2, which may prevent a movement of anions when charge and discharge are carried out while electrode layer 2B of positive electrode 2 adsorbs and desorbs anions. Therefore, it is preferable that additives are decomposed at pre-doping. In order to satisfy the above-mentioned conditions, it is preferable that the added amount of additives is 0.01 wt % or more and 2.0 wt % or less with respect to the weight of carbon material contained in electrode layer 3B.

Furthermore, when $LiPF_6$ is used as an electrolyte, it is preferable that, in at least a part of electrode layer 3B, a value of a ratio of $I_c/I_d$ of peak value $I_c$ that is in the range of 685 eV or more and 690 eV or less in the spectrum of F1s and peak value $I_d$ that is in the range of 680 eV or more and less than 685 eV of the spectrum of F1s is 0.50 or more and less than 2.20 measured by X-ray photoelectron spectroscopy.

It is shown that as the value of peak ratio $I_c/I_d$ is smaller, the presence ratio of lithium fluoride (LiF) is smaller in electrode layer 3B. $LiPF_6$, LiF and $PF_5$ are in equilibrium relation in the electrolytic solution. When the presence ratio of LiF in electrode layer 3B is small, the amount of LiF in the electrolytic solution is increased. Therefore, in order to keep an equilibrium state, $LiPF_6$ is increased, and, at the same time, $PF_5$ is consumed for generating $LiPF_6$. Thus, when the value of peak ratio $I_c/I_d$ is lower than 2.20, the ionization degree of $LiPF_6$ can be enhanced.

Since $PF_5$ is a generation source of the decomposition product of anions forming a coating film of negative electrode 3, when $PF_5$ is consumed, it is possible to suppress generation of the anion decomposition compound formed in negative electrode 3.

In the test of Table 1, the value of peak ratio $I_c/I_d$ is 2.181 in the capacitor of sample A, 2.192 in the capacitor of sample B, and 2.231 in the comparative example.

Note here that the timing at which pre-doping is carried out is not limited to the time after production of element 1, and the timing is not particularly limited as long as it is after production of negative electrode 3. In the pre-doping, these samples are described in which lithium is used as an example of cations. However, the cation is limited to this alone, and any elements may be used as long as they are ionized into a cation. Examples of such element include cesium, rubidium, potassium, barium, strontium, calcium, sodium, and the like, in addition to lithium. Furthermore, in pre-doping, cations stored in the negative electrode and cations contributing to charge and discharge and stored and released by the negative electrode may be different from each other.

Furthermore, the electrolyte is not also limited to $LiPF_6$ and $LiBF_4$, and anions represented by $P(CF_3)_X F_{6-X}^- (1 \leq X \leq 6)$ and $B(CF_3)_Y F_{4-Y}^- (1 \leq Y \leq 4)$, in addition to $PF_6^-$ and $BF_4^-$, and a mixture of two or more of these four types may be useful. Note here that $CF_3$ may be chain and cyclic fluorocarbon such as $C_2F_5$.

Note here that from the viewpoint of improvement of capacity, it is effective that the mixture of two or more is used. The capacity and resistance of positive electrode 2 largely contribute to the capacity and resistance of the capacitor. Electrode layer 2B of positive electrode 2 includes activated carbon, and the amount of anions adsorbed by activated carbon affects the capacity. The diameters of pores of the activated carbon are not uniform but have a predetermined pore diameter distribution. Each of the adsorbed anions has a radius, and a range of pore diameters of the activated carbon suitable for the radius is present. Therefore, by allowing anions having a plurality of anion radii to be adsorbed and desorbed with respect to the pore diameters of the activated carbon having distribution, positive electrode 2 can be provided with more capacitance than that when the activated carbon and a single anion are used.

Furthermore, the capacity of activated carbon is expressed when solvated lithium ions are adsorbed at a positive electrode voltage of 3.0 V or less (vs $Li/Li^+$ electric potential). The solvated states vary according to the types of anions. That is to say, by changing the solvation radius of lithium ions, it is possible to aggressively increase the capacity of positive electrode activated carbon at a positive electrode voltage of 3.0 V or less (vs $Li/Li^+$ electric potential). This phenomenon is unique to a capacitor in which carbon material capable of pre-doping lithium ions is used for the negative electrode and activated carbon is used for the positive electrode so as to form a polarizable electrode.

Note here that it is desirable that the anions of the electrolyte have a higher withstand voltage. At the viewpoint of the withstand voltage of the anion itself, $PF_6^-$ is desirable because it has relatively high voltage resistance. Therefore, when combination of two types or more of anions are used, it is desirable that the combination includes $PF_6^-$.

Furthermore, from the viewpoint of suppressing corrosion of aluminum constituting current collector 2A, it is preferable that a coating film mainly including aluminum fluoride is formed on the surface of aluminum firstly. Since $PF_6^-$ can supply the aluminum surface with $F^-$, a capacitor containing $PF_6^-$ has a higher withstand voltage. From this, once aluminum coating film is electrochemically formed by using $PF_6^-$, and then other anions such as $BF_4^-$ may be added and mixed. By doing so, a coating film of aluminum fluoride can be formed efficiently.

Alternatively, aluminum fluoride can be firstly formed on the surface of current collector 2A, with plate treatment in a dry atmosphere, for example, plasma treatment and gas treatment. Thus, the withstand voltage can be further increased. In addition, when activated carbon is simultaneously subjected to the treatment, it is possible to improve capacity and to reduce resistance. Accordingly, a substantial withstand voltage can be further increased.

Furthermore, the plate treatment in a dry atmosphere is advantageous in that productivity can be largely improved because two or more types of anions can be equally handled when the electrolytic solution is handled.

The solvent for dissolving the above-mentioned electrolyte includes a cyclic carbonate, mixture of chain carbonates, cyclic ester, chain ester, cyclic ether, and chain ether such as propylene carbonate, ethylene carbonate, gammabutyrolactone, sulfolane, ethyl methyl carbonate, dimethyl carbonate, diethyl carbonate, butylene carbonate, and the like. In addition, two or more of organic solvents having an epoxy group, a sulfone group, a vinyl group, a carbonyl group, an amide group, and a cyano group can be appropriately selected.

As mentioned above, in the manufacturing method of a negative electrode for a capacitor in this exemplary embodiment, an aromatic nitro compound is contained as an additive in an electrolytic solution to be used for pre-doping the negative electrode. It is characteristic that this additive is decomposed by lowering the electric potential of the negative electrode to the reduction potential of the additive or less by pre-doping.

Thus, in the negative electrode and the capacitor obtained by the manufacturing method in this exemplary embodiment, it is possible to suppress release of lithium ions stored in the negative electrode by pre-doping from the negative electrode according to charge and discharge, and to suppress raise in the electric potential of the negative electrode. Therefore, large energy density can be maintained.

Note here that in the above description, additives are added into the electrolytic solution and they are decomposed on the surface of the carbon material of electrode layer 3B during pre-doping, thereby controlling a SEI state. As a result, the value of $I_a/I_b$ is 0.45 or more and less than 2.55. However, when the SEI state is controlled by other methods, resulting in setting the value of $I_a/I_b$ in the above-mentioned range, the same effect can be exhibited.

INDUSTRIAL APPLICABILITY

In a negative electrode for a capacitor and a capacitor in accordance with the present invention, by making electric potential of a negative electrode lower than reduction potential of additives included in an electrolytic solution during manufacture, a coating film is formed by decomposing the additives. Thus, raise in the electric potential of the negative electrode generated by repeating charge and discharge can be suppressed. Therefore, the capacitor in accordance with the present invention exhibits a large energy density even in rapid charge and discharge. Such a capacitor is useful as, for example, power sources for hybrid vehicles, which are used for regeneration or backup.

The invention claimed is:

1. An electrode for an electrochemical capacitor, comprising:
   a current collector having electric conductivity; and
   an electrode layer formed on a surface of the current collector, having a cation stored therein, and including an anion, wherein in at least a part of the electrode layer, a value of $I_a/I_b$ falls within a range of 0.45 or more and less than 2.55, where $I_a$ and $I_b$ are peak values measured by X-ray photoelectron spectroscopy method in a spectrum of an atom forming the anion, and $I_a$ indicates a presence of a decomposition compound of the anion and peak value $I_b$ indicates a presence of an electrolyte composed of the cation and the anion.

2. The electrode for electrochemical capacitor according to claim 1, wherein in at least a part of the electrode layer, the $I_a$ is a peak value in a range of 130 eV or more and less than 135 eV in a spectrum of P2p, and the $I_b$ is a peak value in a range from 135 eV to 140 eV, inclusive, in the spectrum of P2p.

3. The electrode for electrochemical capacitor according to claim 1, wherein in at least a part of the electrode layer, a value of $I_c/I_d$ falls within a range of 0.50 or more and less than 2.20, where $I_c$ and $I_d$ are peak values measured by X-ray photoelectron spectroscopy method in a spectrum of F1s, and $I_c$ is a peak value in a range form 685 eV to 690 eV, inclusive, $I_d$ is a peak value in a range of 680 eV or more and less than 685 eV.

4. An electrochemical capacitor comprising:

a capacitor element including:

a positive electrode including a first current collector having electric conductivity, and a first electrode layer formed on a surface of the first current collector;

a negative electrode including a second current collector having electric conductivity, and a second electrode layer formed on a surface of the second current collector; and a separator interposed between the positive electrode and the negative electrode, an electrolytic solution with which the capacitor element is impregnated and which includes an electrolyte containing a cation and an anion; and an exterior member housing the capacitor element and the electrolytic solution, wherein the first electrode layer is capable of adsorbing and desorbing the anion, the second electrode layer has the cation stored therein, and in at least a part of the second electrode layer, a value of $I_a/I_b$ falls within a range of 0.45 or more and less than 2.55, where $I_a$ and $I_b$ are peak values measured by X-ray photoelectron spectroscopy method in a spectrum of an atom forming the anion, and $I_a$ indicates a presence of a decomposition compound of the anion and peak value $I_b$ indicates a presence of the electrolyte.

5. The electrochemical capacitor according to claim 4, wherein in at least a part of the second electrode layer, the $I_a$ is a peak value in a range of 130 eV or more and less than 135 eV in a spectrum of P2p, and the $I_b$ is a peak value in a range from 135 eV to 140 eV, inclusive, in the spectrum of P2p.

6. The electrochemical capacitor according to claim 4, wherein in at least a part of the second electrode layer, a value of $I_c/I_d$ falls within a range of 0.50 or more and less than 2.20, where $I_c$ and $I_d$ are peak values measured by X-ray photoelectron spectroscopy method in a spectrum of F1s, and $I_c$ is a peak value in a range form 685 eV to 690 eV, inclusive, $I_d$ is a peak value in a range of 680 eV or more and less than 685 eV.

\* \* \* \* \*